(12) United States Patent
Panin

(10) Patent No.: US 8,359,345 B2
(45) Date of Patent: Jan. 22, 2013

(54) ITERATIVE ALGORITHMS FOR VARIANCE REDUCTION ON COMPRESSED SINOGRAM RANDOM COINCIDENCES IN PET

(75) Inventor: Vladimir Y. Panin, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 921 days.

(21) Appl. No.: 12/463,946

(22) Filed: May 11, 2009

(65) Prior Publication Data
US 2010/0057819 A1    Mar. 4, 2010

Related U.S. Application Data

(60) Provisional application No. 61/127,055, filed on May 9, 2008.

(51) Int. Cl.
*G06F 7/00*    (2006.01)
*G06F 15/00*    (2006.01)

(52) U.S. Cl. .......................... 708/200; 708/270; 708/274

(58) Field of Classification Search ........................ None
See application file for complete search history.

(56) References Cited

U.S. PATENT DOCUMENTS

| | | | |
|---|---|---|---|
| 6,858,847 B1 | 2/2005 | Macciocchi | |
| 7,381,959 B2 | 6/2008 | Manjeshwar et al. | |
| 2007/0138396 A1* | 6/2007 | Park | 250/363.04 |
| 2010/0014728 A1* | 1/2010 | Stearns | 382/131 |

OTHER PUBLICATIONS

Chen et al., "MicroPET Reconstruction With Random Coincidence Correction Via a Joint Poisson Model," Medical Engineering & Physics, 2008, vol. 30, pp. 680-686, Elsevier Ltd.

* cited by examiner

*Primary Examiner* — Scott Sun
(74) *Attorney, Agent, or Firm* — Peter Kendall

(57) ABSTRACT

The use of the ordinary Poisson iterative reconstruction algorithm in PET requires the estimation of expected random coincidences. In a clinical environment, random coincidences are often acquired with a delayed coincidence technique, and expected randoms are estimated through variance reduction (VR) of measured delayed coincidences. In this paper we present iterative VR algorithms for random compressed sonograms, when previously known methods are not applicable. Iterative methods have the advantage of easy adaptation to any acquisition geometry and of allowing the estimation of singles rates at the crystal level when the number of crystals is relatively small. Two types of sonogram compression are considered: axial (span) rebinning and transaxial mashing. A monotonic sequential coordinate descent algorithm, which optimizes the Least Squares objective function, is investigated. A simultaneous update algorithm, which possesses the advantage of easy parallelization, is also derived for both cases of the Least Squares and Poisson Likelihood objective function.

24 Claims, 4 Drawing Sheets

ITERATIVE ALGORITHMS FOR VARIANCE REDUCTION ON COMPRESSED SINOGRAM RANDOM COINCIDENCES IN PET

BACKGROUND OF THE INVENTION

1. Technical Field

In general, the present disclosure relates to nuclear medical imaging. More particularly, the disclosure relates to Positron Emission Tomography (PET) imaging and accurate estimation of expected random coincidences through variance reduction (VR).

2. General Background of the Invention

Nuclear medicine is a unique specialty wherein radiation emission is used to acquire images that show the function and physiology of organs, bones or tissues of the body. The technique of acquiring nuclear medicine images entails first introducing radiopharmaceuticals into the body—either by injection or ingestion. These radiopharmaceuticals are attracted to specific organs, bones, or tissues of interest. Upon arriving at their specified area of interest, the radiopharmaceuticals produce gamma photon emissions, which emanate from the body and are then captured by a scintillation crystal. The interaction of the gamma photons with the scintillation crystal produces flashes of light, which are referred to as "events." Events are detected by an array of photo detectors (such as photomultiplier tubes), and their spatial locations or positions are then calculated and stored. In this way, an image of the organ or tissue under study is created from detection of the distribution of the radioisotopes in the body.

One particular nuclear medicine imaging technique is known as positron emission tomography, or PET. PET is used to produce images for diagnosing the biochemistry or physiology of a specific organ, tumor or other metabolically active site. The measurement of tissue concentration using a positron emitting radionuclide is based on coincidence detection of the two gamma photons arising from a positron annihilation. When a positron is annihilated by an electron, two 511 keV gamma photons are simultaneously produced and travel in approximately opposite directions. Gamma photons produced by an annihilation event can be detected by a pair of oppositely disposed radiation detectors capable of producing a signal in response to the interaction of the gamma photons with a scintillation crystal. Annihilation events are typically identified by a time coincidence between the detection of the two 511 keV gamma photons in the two oppositely disposed detectors; i.e., the gamma photon emissions are detected virtually simultaneously by each detector. When two oppositely disposed gamma photons each strike an oppositely disposed detector to produce a time coincidence event, they also identify a line-of-response (LOR) along which the annihilation event has occurred. An example of a PET method and apparatus is described in U.S. Pat. No. 6,858,847, which patent is incorporated herein by reference in its entirety.

FIG. 1 is a graphic representation of a line of response. An annihilation event 140 occurring in imaged object mass 130 may emit two simultaneous gamma rays (not shown) traveling substantially 180° apart. The gamma rays may travel out of scanned mass 130 and may be detected by block detectors 110A and 110B, where the detection area of the block detector defines the minimum area or maximum resolution within which the position of an incident gamma ray may be determined. Since block detectors 110A and 110B are unable to determine precisely where the gamma rays were detected within this finite area, the LOR 120 connecting block detectors 110A and 10B may actually be a tube with its radius equal to the radius of block detectors 110A and 110B. Similar spatial resolution constraints are applicable to other types of detectors, such as photomultiplier tubes.

To minimize data storage requirements, clinical projection data are axially compressed, or mashed, to within a predetermined span. With a cylindrical scanner, which has translational symmetry, the geometrical blurring resulting from axial compression may be modeled by projecting a blurred image into LOR space, followed by axial compression. This eliminates the storage of the axial components, and special algorithms have been developed to incorporate system response. The system response modeling then will allow the use of standard reconstruction algorithms such as Joseph's Method, and a reduction of data storage requirements.

The LOR defined by the coincidence events are used to reconstruct a three-dimensional distribution of the positron-emitting radionuclide within the patient. In two-dimensional PET, each 2D transverse section or "slice" of the radionuclide distribution is reconstructed independently of adjacent sections. In fully three-dimensional PET, the data are sorted into sets of LOR, where each set is parallel to a particular detector angle, and therefore represents a two dimensional parallel projection p(s, Φ) of the three dimensional radionuclide distribution within the patient, where "s" corresponds to the displacement of the imaging plane perpendicular to the scanner axis from the center of the gantry, and "Φ" corresponds to the angle of the detector plane with respect to the x axis in (x, y) coordinate space (in other words, Φ corresponds to a particular LOR direction).

Coincidence events are integrated or collected for each LOR and stored in a sonogram. In this format, a single fixed point in f(x, y) traces a sinusoid in the sonogram. In each sonogram, there is one row containing the LOR for a particular azimuthal angle Φ; each such row corresponds to a one-dimensional parallel projection of the tracer distribution at a different coordinate along the scanner axis. This is shown conceptually in FIG. 2.

FIG. 3 depicts mashing and axial rebinning of LOR into sonograms. Five of six LORs are combined in one axial span complex. Four LORs are combined together transaxially.

The ordinary Poisson iterative reconstruction algorithm is now widely-used in the PET imaging field to produce clinically useful data from the sonograms. The model behind the algorithm considers prompt coincidences as independent Poisson variables, with expected values equal to the forward projection of the reconstructed image added to the expected scattered and random contributions. The expected random contribution of line-of-response (LOR) with indexes ij, (where i and j denote crystals in coincidence), can be estimated from a crystal singles rate, according to the classical random rate equation:

$$\bar{r}_{ij} = 2\tau \bar{s}_i \bar{s}_j, \tag{1}$$

where $\bar{s}_i$ is the mean single rate for a given crystal i, and $2\tau$ is the coincidence time window. This approach requires the acquisition of singles rates at the crystal level. A potential problem with this method is that real random coincidences may have additional dead time when compared to singles (due e.g. to multiplexing).

Alternatively, random projection data can be acquired separately, since random events are part of the list mode data. In the latest case, random data are noisy and mean values for the random need to be estimated. We redefine the singles rate as $s_i = \sqrt{2\tau s_i}$, so one does not need to keep track of the multiplicative factor. The problem is the estimation of these single rates from noisy random data.

There are a number of methods that may be used to estimate singles from uncompressed LOR or list mode delayed coincidence data. Analytical methods use equation (1), which is averaged over selected groups of crystals in full coincidence. A measured, mashed group of random data, serves as a good approximation of the mean value. Then the problem is reduced to finding values for the smaller set singles over group of crystals. The Casey smoothing method does not estimate singles rates, but rather estimates expected random data based on large groups of random coincidences. The method from Defrise estimates group singles rates from a set of nonlinear equations using only part of the available data. Both methods are exact and useful for list mode data processing, where large groups of crystals can be defined by the user. The fan sum method is not exact and leads to bias with non-uniformly distributed activity. An analytical method allows for fast pre-processing of data. This is essential in the clinical environment, where image reconstruction consumes most of the available processing time and VR must be performed for each patient bed acquisition. However, the choice of the crystal group in full coincidence can be a complicated task. For example, a group of crystals is commonly chosen to be a detector head. However, on most clinical scanners, only data up to a maximum ring difference are passed to list mode, since the very oblique LORs are not used in reconstruction. Therefore, the detector heads are not in full coincidence and the choice of crystal groups becomes cumbersome. In addition to this, the group size influences the final result.

On the other hand, crystal singles can be estimated by the Maximum Likelihood (ML) approach, where random coincidences are Poisson variables with expected values provided by equation (1). The iterative approach has the advantage of versatility, where all available data are easily accommodated. It is truly a statistical method. This approach results in solving a large system of nonlinear equations iteratively, and is consequently potentially resource consuming. By examining the structure of the objective function in case of list mode data acquisition it was shown that random data have sufficient statistics. In order to estimate singles rate only fan sum of random data are needed. This interesting property has the potential to save histogramming bandwidth when the fan sums are computed at coincidence processor level. The coordinate ascent and surrogate functions monotonic algorithm were developed. Such algorithms are quite fast since there is no need to model mean random data in iterative process, only their fan sum.

In a clinical environment, PET data are acquired with some type of compression to reduce data size. While it is important for prompt data, delayed coincidences are processed by hardware rebinners in a similar way. Two types of data compression are considered in FIG. 3. The first compression is axial (span) compression, where the number of oblique planes is significantly reduced by combining the LOR of similar polar angles. The second compression is transaxial mashing, where the number of sonogram views is reduced by combining the LOR of similar azimuthal angles. Data compression does change the basic random equation (1) and causes the mentioned methodologies to no longer be applicable.

The goal behind of this paper was development of simple update equation iterative algorithms to estimate singles from compressed random data. The first algorithm is Coordinate Descent (CD), which possesses an advantage of fast convergence. Unfortunately, a closed form updated equation can be designed only for a Least Squares objective function. A simultaneous update (SU) algorithm is derived by a surrogate function construction. We consider two SU algorithms. One optimizes the same objective function as a CD algorithm and another optimizes the Poisson Likelihood function.

Unfortunately, in case of compressed data, iterative algorithms need to compare measured random data against modeled random data. Construction of mean random data takes significant time, so algorithms are not computationally fast, comparing with list mode data acquisition, where only fan sum are needed to be constructed.

SUMMARY OF THE INVENTION

An object of embodiments of the present disclosure is to provide simple update iterative algorithms for estimating random coincidences expected during a PET scan. Previously known methods for estimating random coincidences are not directly applicable since compression procedures render previously known methods non-applicable. The iterative methods presented herein have the advantages of easy adaptation to any acquisition geometry, and of allowing estimation expected random coincidences. A monotonic sequential coordinate descent algorithm, which optimizes the Least Squares objective function, is disclosed. Two simultaneous update algorithms, which possess the advantage of easy parallelization, are also disclosed.

DETAILED DESCRIPTION OF THE INVENTION

Data Compression and Objective Functions

Figure 1:
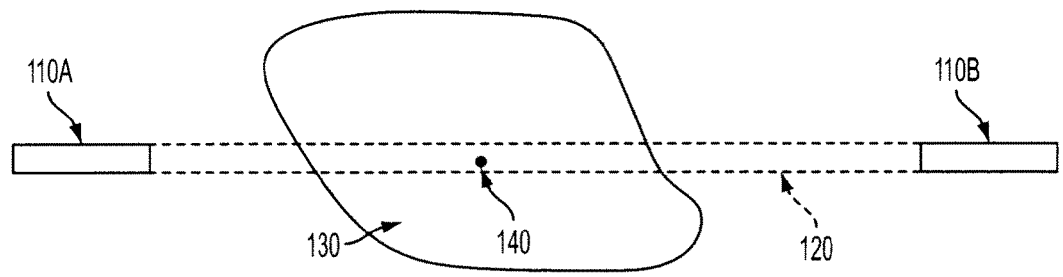
FIG. 1 shows a conceptual representation of a LOR in PET imaging.
Figure 2:
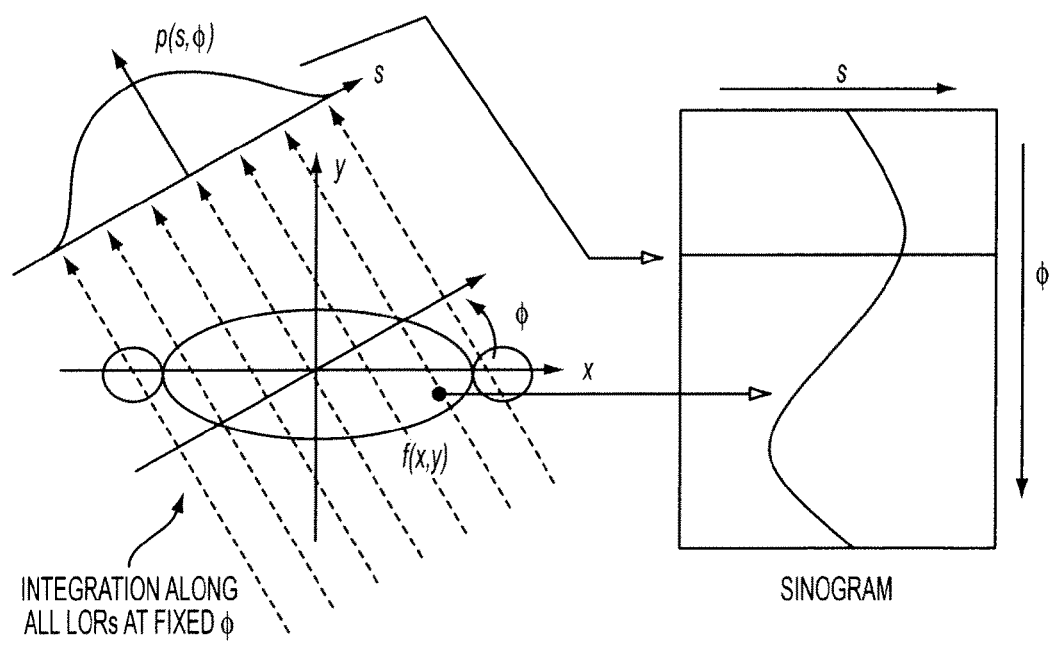
FIG. 2 is an illustration of the development of a sonogram.
Figure 3:
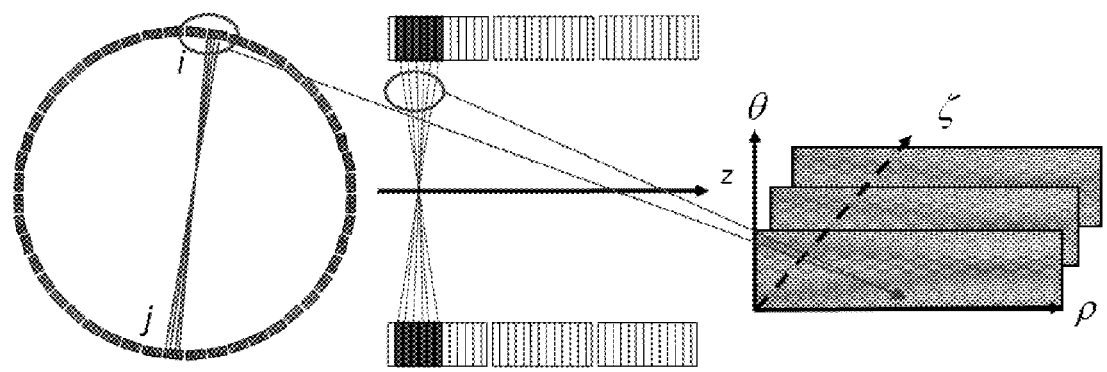
FIG. 3 shows two types of data compression of data compression of LOR data in PET imaging.

Assuming that LOR random data $r_{ij}$ is Poisson variable, the basic random equation for mean value of compressed data is $$\bar{r}_{\rho,\theta,\zeta} = \frac{1}{2}\sum_{i,j} \bar{r}_{ij} = \frac{1}{2}\sum_{i,j} \omega_{\rho\theta\zeta,ij} s_i s_j. \qquad (2)$$

Measured data $r_{\rho\theta\zeta}$ is Poisson variable too. Data are parameterized by $\rho,\theta,\zeta$, where $\rho$ is the radial index, $\theta$ is the azimuthal index, and $\zeta$ is the axial plane index (including oblique and direct planes). r and s are counts, rather than rates, and are measured and estimated for a given time frame. $\omega$ is the ij LOR contribution factor:

$$\omega_{\rho\theta\zeta,ij} = \begin{cases} 1, & \text{if } ij \text{ contribute to sinogram bin } (\rho, \theta, \zeta) \\ 0, & \text{otherwise.} \end{cases} \qquad (3)$$

A factor of ½ in (2) is due to the double summation over crystal indices.

The Least Squares objective function may be minimized to diminish differences between measured data and the modeled mean of random data:

$$LS = \sum_{\rho,\theta,\zeta} (r_{\rho\theta\zeta} - \bar{r}_{\rho\theta\zeta})^2. \quad (4)$$

Since random data are typically uniform in appearance we consider the non-weighted Least Squares objective function. Nevertheless, the weights inclusion is straightforward.

One good example of an objective function from statistical point of view will be a log of Poisson Likelihood function:

$$L = \sum_{\rho,\theta,\zeta} (r_{\rho\theta\zeta} \ln \bar{r}_{\rho\theta\zeta} - \bar{r}_{\rho\theta\zeta}). \quad (5)$$

Coordinate Descent Algorithm

In one embodiment, a simple update equation of the CD method is derived where the objective function is minimized with respect to one parameter, while the rest are fixed. It can be done easily in the case of the Least Squares (Gaussian model) objective function. The Poisson Likelihood model does not provide a simple update equation in the case of mashing/rebinning, when more than one LOR contributes to the sonogram bin. Then a line search should be exploited; however, this significantly complicates the algorithm. The CD method has at least two advantages: fast convergence, and easy implementation of the non-negativity constraint.

If one minimizes (4) only with respect to one parameter, say $\epsilon_k$, then this equation should be solved:

$$0 = \frac{\partial}{\partial \epsilon_k} LS \quad (6)$$
$$= \sum_{\rho,\theta,\zeta} \left( r_{\rho\theta\zeta} - \frac{1}{2} \sum_{i,j} \omega_{\rho\theta\zeta,ij} s_i s_j \right) \times \left( -\sum_{i,j} \omega_{\rho\theta\zeta,ij} (\delta_{i,k} s_j + s_i \delta_{j,k}) \right).$$

The equation can be solved for $\epsilon_k$, taking into account, that $\omega_{\rho\theta\zeta,ij} = 0$ if i=j, since the crystal is never in coincidence with itself. Therefore, the second multiplication factor in (6) does not contain $\epsilon_k$. Then the equation is linear with regards to $\epsilon_k$. This can be written explicitly, extracting $\epsilon_k$ from the first multiplicative factor in (6):

$$\sum_{\rho,\theta,\zeta} \left( r_{\rho\theta\zeta} - \frac{1}{2} \sum_{i \neq k, j \neq k} \omega_{\rho\theta\zeta,ij} s_i s_j \right) \left( \sum_{j \neq k} \omega_{\rho\theta\zeta,kj} s_j \right) - \quad (7)$$
$$s_k \sum_{\rho,\theta,\zeta} \left( \sum_{i \neq k} \omega_{\rho\theta\zeta,ki} s_i \right) \left( \sum_{j \neq k} \omega_{\rho\theta\zeta,kj} s_j \right) = 0.$$

It can be rewritten in additive iterative form to update variable $\epsilon_k$ with respect to a previous value. Such expression will have term $\bar{r}_{\rho\theta\zeta}$, estimated using the previous value of $\epsilon_k$:

$$s_k^{(new)} = s_k^{(old)} + \frac{\sum_{\rho,\theta,\zeta} (r_{\rho\theta\zeta} - \bar{r}_{\rho\theta\zeta}(\epsilon^{(old)})) \left( \sum_{j \neq k} \omega_{\rho\theta\zeta,kj} s_j \right)}{\sum_{\rho,\theta,\zeta} \left( \sum_{j \neq k} \omega_{\rho\theta\zeta,kj} s_j \right)^2}. \quad (8)$$

One convenient implementation is crystal-driven. For each crystal k, one needs to consider all corresponding opposite crystals in coincidence. From such knowledge of two particular crystals, a corresponding sonogram bin is accessed. An exemplary crystal-driven equation is:

$$s_k^{(n)} = s_k^{(n-1)} + \frac{\sum_{j \neq k} s_j^{(n,k)} \omega_{\rho\theta\zeta,kj} (r_{\rho\theta\zeta} - \bar{r}_{\rho\theta\zeta}(s^{(n,k)}))}{\sum_{j \neq k} \omega_{\rho\theta\zeta,kj} s_j^{2(n,k)}}, \quad (9)$$

$$s^{(n,k)} = \{s_0^{(n)}, s_1^{(n)}, \ldots, s_{k-1}^{(n)}, s_k^{(n-1)}, s_{k+1}^{(n-1)}, \ldots\}. \quad (10)$$

Here n is iteration number. A single iteration may consist of updating all crystal single values. The summation over sonogram indices was explicitly removed: $\rho\theta\zeta$ is uniquely defined by the k-j pair. In the denominator expression we also assumed that $$\sum_{\rho,\theta,\zeta} \omega_{\rho\theta\zeta,kj} \omega_{\rho\theta\zeta,kj'} \neq 0, \text{ if } j = j',$$

since it was true for our mashing/rebinning scheme. Definition (10) represents an exemplary idea of sequential CD algorithm: the very last update of crystal efficiencies should be used in estimation of current crystal single. This definition implies that updates are performed according to crystal index. The crystal with index zero updated first, then the crystal with index 1 is updated and so on.

The CD algorithm is difficult to parallelize in the case of compressed data, comparing with list mode data acquisition. The value $\bar{r}_{\rho\theta\zeta}$ depends on the cluster of crystals of the same blocks due to mashing and rebinning. Therefore, this term should be updated immediately after the update of every crystal single. When k crystal is updated, a loop over corresponding opposite crystals in coincidence is performed, subtracting an old value of product of k crystal and crystal in coincidence singles and adding multiplicative term with a new crystal single in corresponding $\bar{r}_{\rho\theta\zeta}$. Such updates are prone to round off error when many iterations are performed. To exclude this effect $\bar{r}_{\rho\theta\zeta}$ may be recomputed at every iteration, when the value of the objective function is estimated.

In the following we will reference update equation (9) as the CD-LS algorithm.

Simultaneous Update (SU) Algorithms

In this section, exemplary algorithms of gradient type are derived. In case of the LS objective function, the algorithm has a simple update equation at iteration n:

$$s_k^{(n)} = s_k^{(n-1)} - \alpha_k^{(n-1)} \frac{\partial LS}{\partial s_k}\bigg|_{s_k^{(n-1)}}. \quad (11)$$

A surrogate function is used to derive positive value step size $\alpha$. First, it is assumed that the objective function can be well approximated by a second order Taylor's expression with regards to a current singles estimate of iteration n−1

$$LS(s) \approx T_1(s, s^{(n-1)}) = LS(s^{(n-1)}) + \frac{\partial LS}{\partial s_l}\bigg|_{s^{(n-1)}} (s_l - s_l^{(n-1)}) + \frac{1}{2} \frac{\partial^2 LS}{\partial s_l \partial s_m}\bigg|_{s^{(n-1)}} \quad (12)$$
$$(s_l - s_l^{(n-1)})(s_m - s_m^{(n-1)}).$$

$\Delta s_l$ may be defined as, for example, $\Delta s_l = (s_l - s_l^{(n-1)})$. Using non equalities $$\Delta s_l \Delta s_m \leq \frac{1}{2}(\Delta s_l^2 + \Delta s_m^2) - \Delta s_l \Delta s_m \leq \frac{1}{2}(\Delta s_l^2 + \Delta s_m^2), \quad (13)$$

a separable surrogate function can be constructed $$T_1(s, s^{(n-1)}) \leq T_2(s, s^{(n-1)}) = LS(s^{(n-1)}) + \left.\frac{\partial LS}{\partial s_l}\right|_{s^{(n-1)}} (s_l - s_l^{(n-1)}) + \quad (14)$$
$$\frac{1}{2}\left|\left.\frac{\partial^2 LS}{\partial s_l \partial s_m}\right|_{s^{(n-1)}}\right| \frac{(s_l - s_l^{(n-1)})^2 + (s_m - s_m^{(n-1)})^2}{2}.$$

Here absolute value of $$\frac{\partial^2 LS}{\partial s_l \partial s_m}$$

is used. The value and the gradient of the surrogate function $T_2(s, s^{(n-1)})$ coincides with the ones of the $T_1(s, s^{(n-1)})$ objective function at $s^{(n-1)}$. The surrogate function lies above $T_1(s, s^{(n-1)})$. In approximation $$\bar{r}_{\rho\theta\zeta} \approx \bar{r}_{\rho\theta\zeta}, \quad (15)$$

which is accurate close to solution, $$\frac{\partial^2 LS}{\partial s_l \partial s_m}$$

is positive, assuming positive $s^{(n-1)}$, so the surrogate function closely approximates a truncated series. However, this term positivity is not necessary in general and the second of non equalities (13) is used to construct a surrogate function. If expansion (12) is sufficiently accurate, the algorithm will show monotonic behavior; however this property is not guaranteed by the present exemplary derivation.

Finally, update equation in case of LS objective function, using approximation (15) in term $$\frac{\partial^2 LS}{\partial s_l \partial s_m},$$

which defines a step size, has the form:

$$s_k^{(n+1)} = s_k^{(n)} + \frac{\sum_{j \neq k} s_j^{(n)} \omega_{\rho\theta\zeta,kj}(r_{\rho\theta\zeta} - \bar{r}_{\rho\theta\zeta}(s^{(n)}))}{\sum_{j \neq k} s_j^{(n)} \omega_{\rho\theta\zeta,kj} \sum_{\rho\theta\zeta}^{(n)}}, \quad (16)$$

where $$\sum_{\rho\theta\zeta}^{(n)} = \frac{1}{2}\sum_{ij}\omega_{\rho\theta\zeta,ij}(s_i^{(n)} + s_j^{(n)}) \quad (17)$$

In the following we will reference update equation (16) as SU-LS algorithm.

In the case of the L objective function, a second exemplary derivation is similar. The surrogate function is contracted to have a lower value with regards to truncated expansion. The term $$\frac{\partial^2 L}{\partial s_l \partial s_m}$$

has negative value in approximation (15) and assumption of positive $s^{(n-1)}$.

The crystal-driven update equation for maximizing L objective function has the following form:

$$s_k^{(n+1)} = s_k^{(n)} + \frac{\sum_{j \neq k} s_j^{(n)} \omega_{\rho\theta\zeta,kj}\left(\frac{r_{\rho\theta\zeta}}{\bar{r}_{\rho\theta\zeta}(s^{(n)})} - 1\right)}{\sum_{j \neq k} s_j^{(n)} \omega_{\rho\theta\zeta,kj} \frac{\sum_{\rho\theta\zeta}^{(n)}}{\bar{r}_{\rho\theta\zeta}(s^{(n)})}}. \quad (18)$$

In the following we will reference update equation (16) as SU-L algorithm. Once again summation over sonogram indices was explicitly removed in (16)-(18): $\rho\theta\zeta$ is uniquely defined by the k-j pair.

An advantage of these exemplary algorithms is that they are straightforwardly easy to be parallelized. Non-negativity constrain is implemented in the same way as in case of CD algorithm. If single update has negative value it is replaced by some small positive value.

Initial Condition

The CD algorithm is sensitive to the initial condition. The use of truncated expansion in the SU algorithm derivation is justified close to solution. The solution also allows for a negative value of crystal singles. It is possible to find a good initial condition. As an example, an initial condition that provides a positive value of singles is obtained through the global surrogate function of the Poisson Likelihood objective function. The concavity of log function is used $$\ln\left(\frac{1}{2}\sum_{ij}\omega_{\rho\theta\zeta,ij}s_i s_j\right) \geq \frac{1}{2N_{\rho\theta\zeta}}\sum_{ij}\omega_{\rho\theta\zeta,ij}\ln(s_i s_j) + \ln(N_{\rho\theta\zeta}), \quad (19)$$

where $$N_{\rho\theta\zeta} = \frac{1}{2}\sum_{ij}\omega_{\rho\theta\zeta,ij}. \quad (20)$$

is the number of LORs contribution to particular $\bar{r}_{\rho\theta\zeta}$. Using $$s_i s_j \leq \frac{1}{2}(s_i^2 + s_j^2), \quad (21)$$

$$L \geq \quad (22)$$
$$\frac{1}{2}\sum_{ij}\sum_{\rho,\theta,\zeta}\omega_{\rho\theta\zeta,ij}\left\{\frac{r_{\rho\theta\zeta}}{N_{\rho\theta\zeta}}(\ln s_i + \ln s_j) - \frac{s_i^2 + s_j^2}{2}\right\} + \sum_{\rho,\theta,\zeta}r_{\rho\theta\zeta}\ln(N_{\rho\theta\zeta}).$$

The global surrogate function is separable and its maximum corresponds to $$s_k^{(0)} = \sqrt{\frac{\sum_{j \neq k} \omega_{\rho\theta\zeta,kj} \frac{r_{\rho\theta\zeta}}{N_{\rho\theta\zeta}}}{\sum_{j \neq k} \omega_{\rho\theta\zeta,kj}}}. \quad (23)$$

This may serve as the initial condition to all exemplary algorithms.

Figure 4:
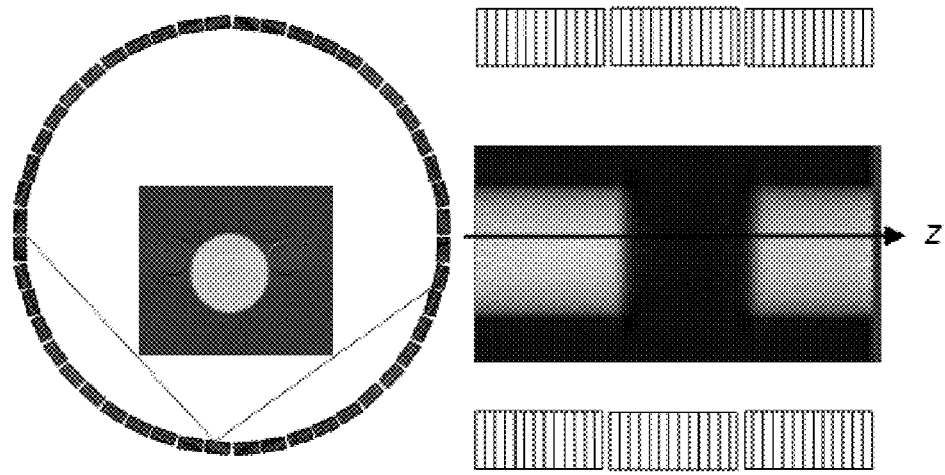
FIG. 4 is an illustration of an object used for random sonogram study.

FIG. 4 depicts an object used for random sonogram study. The transaxial fan of crystals in coincidence are also shown on the right-hand side.

Figure 5:
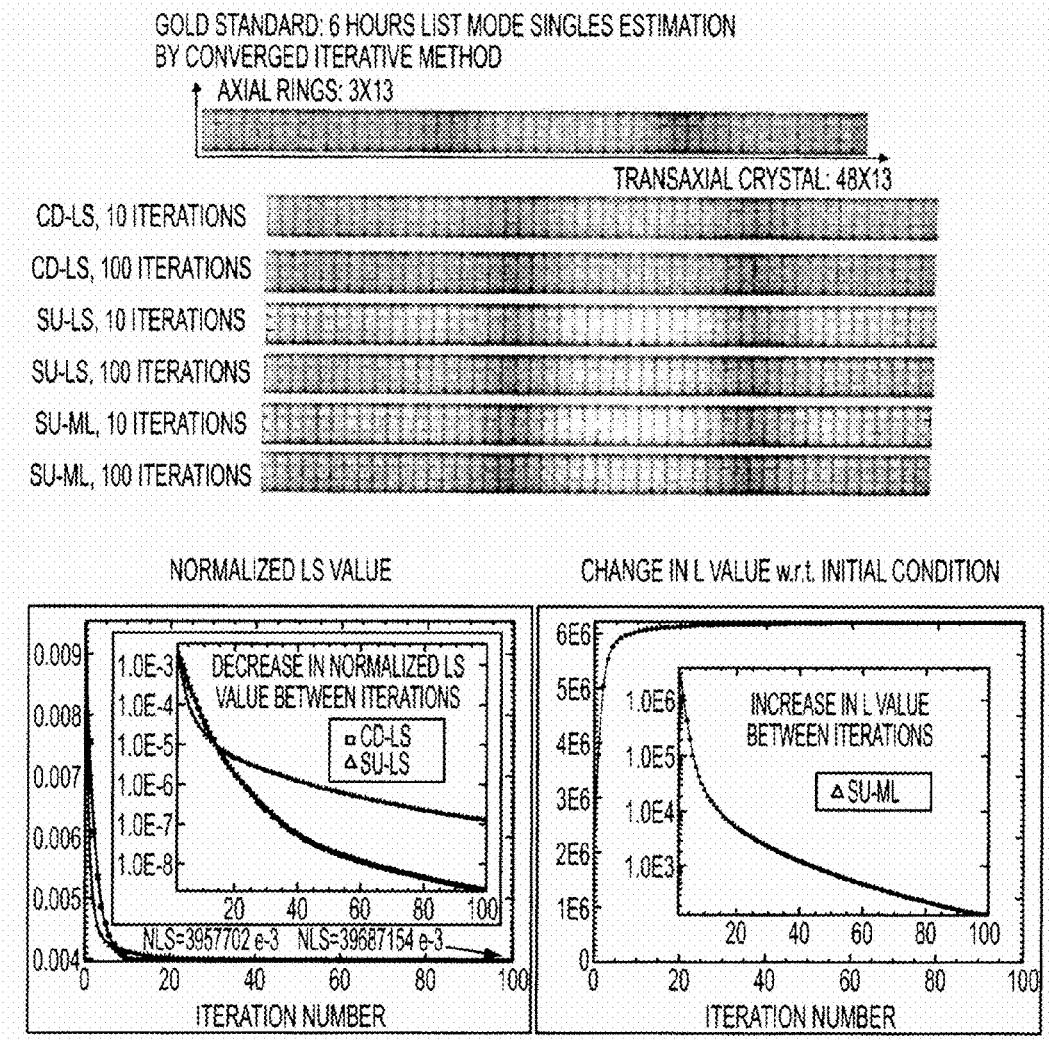
FIG. 5 illustrates reconstruction of singles from random data in case of 6 hours scan by three embodiments.

The exemplary random VR algorithms were tested for data acquired in list mode format on the Siemens TruePoint scanner, schematically presented in FIG. 5. This scanner consists of 144 blocks of 13×13 crystals. The blocks are organized as three blocks (rings) in the axial direction and 48 blocks in the transaxial direction. The total number of crystals is 24336. The scanner consists of 39 rings; however, the list mode file contains data with a maximum ring difference of 27. Transaxially, each block is in coincidence with 26 opposite blocks, see FIG. 4.

Six hours of list mode (LM) files were acquired on one bed position with two Ge-68 cylinders spaced axially with cold arms. This phantom is depicted on FIG. 6. The variation in the random sonogram values was large as 35%.

A random mashed and rebinned sonogram was produced from list mode data with span 11 and mash factor 4, resulting in a 336(radial)×84(azimuthal)×313(axial) sonogram bin size. Two sonogram time frames were considered. The first corresponded to the first acquisition minute. Sonogram contained ~5M random and ~5M true counts. The second, full six hour, random data served as a gold standard for VR random sonogram.

Singles were estimated directly from the list mode file by the Coordinate Ascent method [7, 8]. This estimation served as a gold standard for singles distribution, since uncompressed data provide the best possible estimation.

FIG. 5 shows the exemplary algorithms performance in case of high count six hours scan. All algorithms showed monotonical behavior. The SU updates provided a smoother singles distribution when compared to the CD method, when the same number of iterations was exploited. The CD algorithm eventually converged to a smaller value of the normalized LS objective function. Contrary to computer simulations, the CD method was not faster at converging at earlier iterations.

Figure 6:
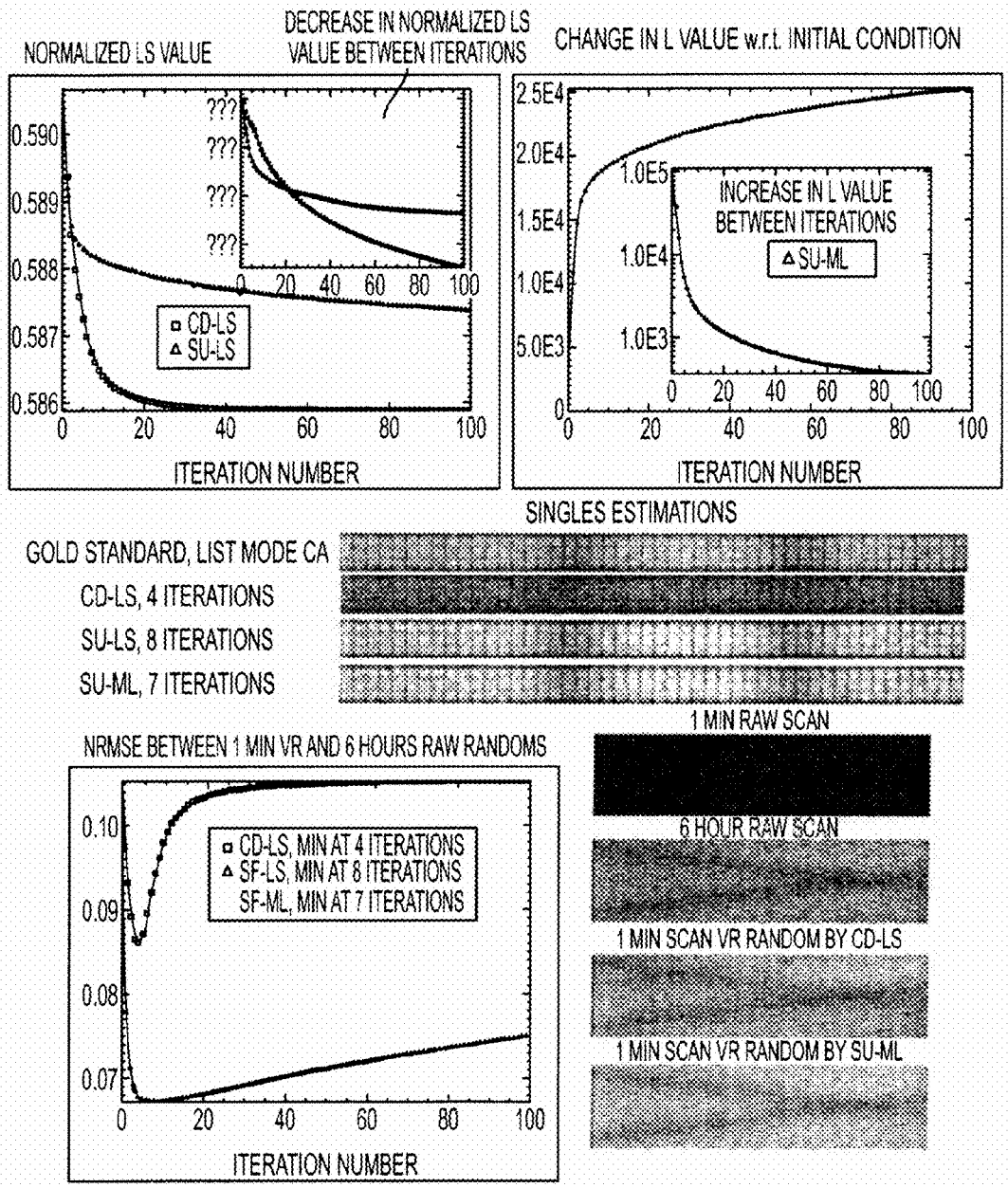
FIG. 6 illustrates reconstruction of singles from random data and VR randoms in case of 1 min scan by three exemplary embodiments.

FIG. 6 shows the algorithm's performance in case a one minute scan. List mode estimation still provided very good singles estimation, slightly noisier with respect to a 6 hour scan. Estimation from compressed data, however, displayed noise explosion phenomena at a large iteration number. The CD-SU algorithm estimation suffers most from it due to fast high frequencies convergence. Intrinsic regularization property of SU methods allows for smoother singles estimation at early iterations. In order to optimize algorithm performance with respect to iteration number, VR random sonograms were compared with six hours raw scan by computing NRMSE difference between these two data sets. According to this figure of merit, the CD-LS algorithm should be stopped after 4 iterations. The SU-LS and SU-ML algorithms showed very similar performance and should stop after 7 or 8 iterations. The intrinsic regularization property of SU methods allows for smother useful singles estimations.

While the one minute raw sonogram shows nothing but noise, VR sonograms resembled six hours of raw scan. The CD-LS method produced noisy singles distribution and it in turn led to additional artificial strips in a VR sonogram. The SU methods did not produce such artifacts in the sonogram at least in the visual estimation.

Those of ordinary skill may vary the data collection apparatus and methods for recording and processing the images without varying from the scope of the invention as defined in the appended claims.

What is claimed is:

1. A method of estimating expected random coincidence data during a PET scan, the method comprising:
    scanning a subject using a PET scanner to obtain coincidence event data from a plurality of scintillation crystals;
    compressing the coincidence event data, thereby generating compressed coincidence event data;
    processing the compressed coincidence event data using an iterative algorithm to estimate singles data; and
    calculating the expected random coincidence data using the estimate singles data.

2. The method according to claim 1, wherein processing the compressed coincidence event data comprises performing a simple update iterative algorithm on the compressed coincidence event data to generate an estimate of expected singles data.

3. The method according to claim 2, wherein the compression algorithm is selected from a group consisting of axial rebinning, azimuthal mashing, and axial rebinning and azimuthal mashing.

4. The method according to claim 3, wherein the simple update iterative algorithm is derived for an objective function.

5. The method according to claim 4, wherein calculating the expected count of random coincidences comprises using an equation $$\bar{r}_{\rho,\theta,\zeta} = \frac{1}{2}\sum_{i,j} \bar{r}_{ij} = \frac{1}{2}\sum_{i,j} \omega_{\rho\theta\zeta,ij} s_i s_j,$$

wherein, $\bar{r}_{\rho,\theta,\zeta}$ is the expected count of random coincidences, $\rho$ is a radial index, $\theta$ is an azimuthal index, $\zeta$ is an axial plane index, s is a count of random events for a given crystal i or j, and $\omega$ is an LOR contribution factor.

6. The method according to claim 5, wherein the objective function is a Least Squares function comprising an equation $$LS = \sum_{\rho,\theta,\zeta} (r_{\rho\theta\zeta} - \bar{r}_{\rho\theta\zeta})^2,$$

wherein $r_{\rho\theta\zeta}$ is the actual count of random coincidences.

7. The method according to claim 5, wherein the objective function is a log of a Poisson Likelihood function comprising an equation $$L = \sum_{\rho,\theta,\zeta} (r_{\rho\theta\zeta} \ln \bar{r}_{\rho\theta\zeta} - \bar{r}_{\rho\theta\zeta}).$$

8. The method according to claim 6, wherein the simple update iterative algorithm comprises an equation $$s_k^{(n)} = s_k^{(n-1)} + \frac{\sum_{j \neq k} s_j^{(n,k)} \omega_{\rho\theta\zeta,kj}(r_{\rho\theta\zeta} - \bar{r}_{\rho\theta\zeta}(s^{(n,k)}))}{\sum_{j \neq k} \omega_{\rho\theta\zeta,kj} s_j^{2(n,k)}},$$

wherein $$s^{(n,k)} = \{s_0^{(n)}, s_1^{(n)}, \ldots, s_{k-1}^{(n)}, s_k^{(n-1)}, s_{k+1}^{(n-1)}, \ldots\}$$

and n is an iteration number.

9. The method according to claim 6, wherein the simple update iterative algorithm comprises an equation $$s_k^{(n+1)} = s_k^{(n)} + \frac{\sum_{j \neq k} s_j^{(n)} \omega_{\rho\theta\zeta,kj}(r_{\rho\theta\zeta} - \bar{r}_{\rho\theta\zeta}(s^{(n)}))}{\sum_{j \neq k} s_j^{(n)} \omega_{\rho\theta\zeta,kj} \Sigma_{\rho\theta\zeta}^{(n)}},$$

wherein $$\Sigma_{\rho\theta\zeta}^{(n)} = \frac{1}{2} \sum_{ij} \omega_{\rho\theta\zeta,ij}(s_i^{(n)} + s_j^{(n)}),$$

and n is an iteration number.

10. The method according to claim 7, wherein the simple update iterative algorithm comprises an equation $$s_k^{(n+1)} = s_k^{(n)} + \frac{\sum_{j \neq k} s_j^{(n)} \omega_{\rho\theta\zeta,kj}\left(\frac{r_{\rho\theta\zeta}}{\bar{r}_{\rho\theta\zeta}(s^{(n)})} - 1\right)}{\sum_{j \neq k} s_j^{(n)} \omega_{\rho\theta\zeta,kj} \frac{\Sigma_{\rho\theta\zeta}^{(n)}}{\bar{r}_{\rho\theta\zeta}(s^{(n)})}},$$

wherein n is an iteration number.

11. The method according to claim 8 wherein an initial condition of the simple update iterative algorithm comprises a value represented by an equation $$s_k^{(0)} = \sqrt{\frac{\sum_{j \neq k} \omega_{\rho\theta\zeta,kj} \frac{r_{\rho\theta\zeta}}{N_{\rho\theta\zeta}}}{\sum_{j \neq k} \omega_{\rho\theta\zeta,kj}}}.$$

12. The method according to claim 10 wherein an initial condition of the simple update iterative algorithm comprises a value represented by an equation $$s_k^{(0)} = \sqrt{\frac{\sum_{j \neq k} \omega_{\rho\theta\zeta,kj} \frac{r_{\rho\theta\zeta}}{N_{\rho\theta\zeta}}}{\sum_{j \neq k} \omega_{\rho\theta\zeta,kj}}}.$$

13. A computer program embodied as computer-executable instructions stored on a non-transitory computer-readable medium for estimating expected random coincidence data during a PET scan, the program comprising instructions for:

scanning a subject using a PET scanner to obtain coincidence event data from a plurality of scintillation crystals;

compressing the coincidence event data, thereby generating compressed coincidence event data;

processing the compressed coincidence event data using an iterative algorithm to estimate singles data; and calculating the expected random coincidence data using the estimated singles data.

14. The program according to claim 13, wherein processing the compressed coincidence event data comprises performing a simple update iterative algorithm on the compressed random event data to generate an estimate of expected singles data.

15. The program according to claim 14, wherein the compression algorithm is selected from a group consisting of axial rebinning, azimuthal mashing, and axial rebinning and azimuthal mashing.

16. The program according to claim 15, wherein the simple update iterative algorithm is derived for an objective function.

17. The program according to claim 16, wherein calculating the expected count of random coincidences comprises using an equation $$\bar{r}_{\rho\theta\zeta} = \frac{1}{2} \sum_{i,j} \bar{r}_{ij} = \frac{1}{2} \sum_{i,j} \omega_{\rho\theta\zeta,ij} s_i s_j,$$

wherein, $\bar{r}_{\rho,\theta,\zeta}$ is the expected count of random coincidences, $\rho$ is a radial index, $\theta$ is an azimuthal index, $\zeta$ is an axial plane index, s is a count of random events for a given crystal i or j, and $\omega$ is an LOR contribution factor.

18. The program according to claim 17, wherein the objective function is a Least Squares function comprising an equation $$LS = \sum_{\rho,\theta,\zeta} (r_{\rho\theta\zeta} - \bar{r}_{\rho\theta\zeta})^2,$$

wherein, $r_{\rho\theta\zeta}$ is the actual count of random coincidences.

19. The program according to claim 17, wherein the objective function is a log of a Poisson Likelihood function comprising an equation $$L = \sum_{\rho,\theta,\zeta} (r_{\rho\theta\zeta} \ln \bar{r}_{\rho\theta\zeta} - \bar{r}_{\rho\theta\zeta}).$$

20. The program according to claim 18, wherein the simple update iterative algorithm comprises an equation $$s_k^{(n)} = s_k^{(n-1)} + \frac{\sum_{j \neq k} s_j^{(n,k)} \omega_{\rho\theta\zeta,kj}(r_{\rho\theta\zeta} - \bar{r}_{\rho\theta\zeta}(s^{(n,k)}))}{\sum_{j \neq k} \omega_{\rho\theta\zeta,kj} s_j^{2(n,k)}},$$

wherein $$s^{(n,k)} = \{s_0^{(n)}, s_1^{(n)}, \ldots, s_{k-1}^{(n)}, s_k^{(n-1)}, s_{k+1}^{(n-1)}, \ldots\}$$

and n is an iteration number.

21. The program according to claim 18, wherein the simple update iterative algorithm comprises an equation $$s_k^{(n+1)} = s_k^{(n)} + \frac{\sum_{j \neq k} s_j^{(n)} \omega_{\rho\theta\zeta,kj}(r_{\rho\theta\zeta} - \bar{r}_{\rho\theta\zeta}(s^{(n)}))}{\sum_{j \neq k} s_j^{(n)} \omega_{\rho\theta\zeta,kj} \Sigma_{\rho\theta\zeta}^{(n)}},$$

wherein $$\Sigma_{\rho\theta\zeta}^{(n)} = \frac{1}{2} \sum_{ij} \omega_{\rho\theta\zeta,ij}(s_i^{(n)} + s_j^{(n)}),$$

and n is an iteration number.

22. The program according to claim 19, wherein the simple update iterative algorithm comprises an equation $$s_k^{(n+1)} = s_k^{(n)} + \frac{\sum_{j \neq k} s_j^{(n)} \omega_{\rho\theta\zeta,kj} \left( \frac{r_{\rho\theta\zeta}}{\bar{r}_{\rho\theta\zeta}(s^{(n)})} - 1 \right)}{\sum_{j \neq k} s_j^{(n)} \omega_{\rho\theta\zeta,kj} \frac{\Sigma_{\rho\theta\zeta}^{(n)}}{\bar{r}_{\rho\theta\zeta}(s^{(n)})}},$$

wherein n is an iteration number.

23. The program according to claim 20 wherein an initial condition of the simple update iterative algorithm comprises a value represented by an equation $$s_k^{(0)} = \sqrt{\frac{\sum_{j \neq k} \omega_{\rho\theta\zeta,kj} \frac{r_{\rho\theta\zeta}}{N_{\rho\theta\zeta}}}{\sum_{j \neq k} \omega_{\rho\theta\zeta,kj}}}.$$

24. The program according to claim 22 wherein an initial condition of the simple update iterative algorithm comprises a value represented by an equation $$s_k^{(0)} = \sqrt{\frac{\sum_{j \neq k} \omega_{\rho\theta\zeta,kj} \frac{r_{\rho\theta\zeta}}{N_{\rho\theta\zeta}}}{\sum_{j \neq k} \omega_{\rho\theta\zeta,kj}}}.$$

* * * * *